(12) United States Patent
Vlaj (10) Patent No.: US 10,508,440 B1
(45) Date of Patent: Dec. 17, 2019

(54) SECURITY AND TRANSPORTATION SYSTEM FOR BORDER BARRIER

(71) Applicant: Ales Vlaj, Miami Beach, FL (US)

(72) Inventor: Ales Vlaj, Miami Beach, FL (US)

( * ) Notice: Subject to any disclaimer, the term of this patent is extended or adjusted under 35 U.S.C. 154(b) by 0 days.

(21) Appl. No.: 16/444,633

(22) Filed: Jun. 18, 2019

(51) Int. Cl.
*B61B 5/00* (2006.01)
*E04B 2/56* (2006.01)
*E04H 1/12* (2006.01)
*E01F 15/08* (2006.01)

(52) U.S. Cl.
CPC .......... *E04B 2/56* (2013.01); *B61B 5/00* (2013.01); *E01F 15/085* (2013.01); *E04H 1/12* (2013.01)

(58) Field of Classification Search
CPC ... B61B 5/00; B61B 13/04; B61B 9/00; E01F 15/085; E01F 15/08; E04H 1/12
See application file for complete search history.

(56) References Cited

U.S. PATENT DOCUMENTS

| | | | | |
|---|---|---|---|---|
| 3,710,727 A * | 1/1973 | Svensson | ............... | B61B 13/04 104/120 |
| 4,885,995 A * | 12/1989 | Antosh | ................. | B60L 13/10 104/118 |
| 4,958,575 A * | 9/1990 | Antosh | ................. | B60L 13/10 104/118 |
| 2009/0230205 A1 * | 9/2009 | Hepner | ................. | E01B 25/08 238/2 |
| 2010/0011986 A1 * | 1/2010 | Pumpelly | ............... | B61B 13/04 105/215.2 |
| 2010/0326314 A1 * | 12/2010 | Kissel | .................... | B61B 13/04 104/119 |
| 2013/0186297 A1 * | 7/2013 | Kissel | ...................... | B61B 5/02 104/124 |
| 2014/0305331 A1 * | 10/2014 | Bavaresco | ............... | B61B 9/00 104/173.1 |
| 2018/0178813 A1 * | 6/2018 | Garza | ...................... | B61B 5/00 |
| 2018/0208217 A1 * | 7/2018 | Grip | ........................ | B61B 13/10 |
| 2018/0286230 A1 * | 10/2018 | Hong | .................... | G08G 1/095 |
| 2019/0226164 A1 * | 7/2019 | Habodasz | ............ | E01D 19/103 |

* cited by examiner

*Primary Examiner* — Gisele D Ford
(74) *Attorney, Agent, or Firm* — Mark Terry (57) ABSTRACT

An improved border barrier system is disclosed. The system includes columns situated periodically along an international border, beams extending horizontally between tops of the columns, metallic based walls extending between each pair of columns, a power line extending within the beams, a continuous electric railway located on top of the horizontal surface, electric rail cars powered by the electric railway, sensor arrays located periodically along the border barrier system, stations located periodically along the border barrier system, each station including a housing structure configured for housing personnel, a power generating station or power relay station coupled to the power line and the electric railway for powering the electric railway, and a tunnel that allows the electric railway to enter one end of the housing structure and exit another end of the housing structure.

5 Claims, 11 Drawing Sheets

SECURITY AND TRANSPORTATION SYSTEM FOR BORDER BARRIER

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of border safety and security, and, more specifically, relates to security and transportations systems for border barriers.

BACKGROUND

A border barrier is a separation barrier that runs along an international border. Such barriers are typically constructed for border control purposes such as curbing illegal immigration, human trafficking, and smuggling. A border barrier can also serve as a de facto consolidation of a territorial claim that can supersede formal delimitation. One version of a border barrier is a border wall. An example of a border wall includes the Mexico—United States barrier, which is a series of vertical barriers along the Mexico—United States border intended to reduce illegal immigration to the United States from Mexico. The Mexico—United States barrier is not a continuous structure, but a series of obstructions classified as "fences" or "walls". Another example of a border wall includes the ancient Great Wall of China, which is a series of walls separating China from nomadic empires to the north.

Building and maintaining a border barrier can be expensive, time-consuming and fraught with peril. Construction in desolate areas can increase transportation costs to the construction site, as well as place a burden on the construction team. Also, the construction of such a big structure can involve large amounts of people, man hours and heavy equipment, which inherently includes some risk of injury or death. Additionally, construction in area with difficult geography, such as mountainous areas, can increase construction costs, as well as risks to the workers. With regard to maintenance, even after a border barrier is built, it can be difficult for workers or border guards to reach all points on the border barrier, in cases where lengths are excessive. Further, there is the issue of power being available to remote areas of the border barrier. In areas that are far from cities and towns, the border barrier may not have power readily accessible, making it difficult or impossible to power devices and machines necessary to monitor or maintain the barrier. Lastly, border barriers are often built in areas with difficult geographies, such as mountainous areas, which makes it difficult to reach the border barrier in said areas, as well as maintain the barrier in the same areas.

Therefore, what is needed is a system and method for improving upon the problems with the prior art, and more particularly for a more efficient and cost-effective way to build and maintain border barriers.

SUMMARY

An improved border barrier system is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

The disclosed embodiments address inefficiencies of the art in respect to border barrier systems. In one embodiment, an improved border barrier system is disclosed. The system includes a plurality of columns extending vertically and situated periodically along or substantially near an international border, a plurality of beams extending horizontally between tops of the columns, thereby producing a continuous horizontal surface along the tops of the columns, a plurality of metallic based walls extending between each pair of columns, a power line extending within the plurality of beams, wherein the power line supplies power from a power generating station or a power relay station, at least one continuous electric railway located on top of the horizontal surface, wherein the electric railway is coupled to the power line, a plurality of electric rail cars powered by the electric railway, wherein the electric rail cars run along the electric railway, a plurality of sensor arrays located periodically along the border barrier system, wherein each sensor array is coupled to the power line, and wherein each sensor array comprises a vertical shaft, a video sensor, an audio sensor, an infrared sensor, a heat sensor, a motion sensor, a light sensor, a seismic sensor, and at least one light for providing illumination, a plurality of stations located periodically along the border barrier system, each station comprising: 1) a housing structure configured for housing personnel; 2) a power generating station or power relay station coupled to the power line and the electric railway for powering the electric railway; and 3) a tunnel that allows the electric railway to enter one end of the housing structure and exit another end of the housing structure.

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope. Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a more energy efficient and easy-to-navigate border barrier system. The disclosed embodiments further improve over the prior art by providing a more environmentally friendly system that greatly reduces pollution in emissions, such as carbon dioxide, carbon monoxide, oxides of sulfur, oxides of nitrogen, hydrocarbons, particulates, and heavy metals. The disclosed embodiments further improve over the prior art by providing a border barrier that is less expensive, less time-consuming and less dangerous to build and maintain. The disclosed embodiments allow for quicker and easier construction in desolate areas, thereby reducing transportation costs to the construction site, and the burden on the construction team. The disclosed embodiments allow for reduced risk of injury or death to workers. The disclosed embodiments allow for easier construction in areas with difficult geographies, such as mountainous areas, can increase construction costs. The disclosed embodiments allow for workers or border guards to reach all points on the border barrier and allows power to be readily available to remote areas of the border barrier, thereby powering devices and machines necessary to monitor or maintain the barrier.

Figure 1:
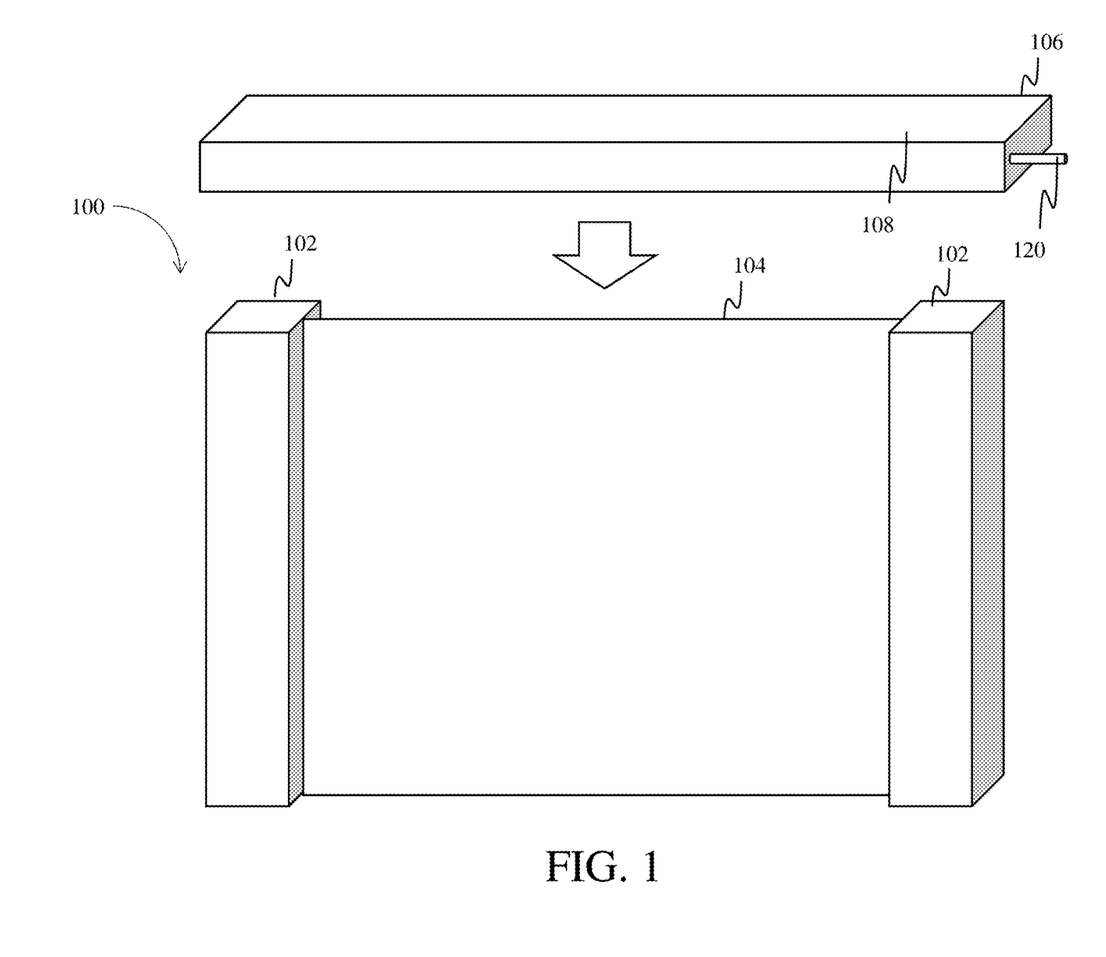
FIG. 1 is a drawing depicting a segment of wall of an improved border barrier system, according to an example embodiment.

Referring now to the Figures, FIG. 1 is a drawing depicting a segment 100 of wall of an improved border barrier system, according to an example embodiment. FIG. 1 shows that the segment 100 includes a pair of columns 102 extending vertically and situated along or substantially near an international border, in addition to a beam 106 extending horizontally between tops of the columns, thereby producing a continuous horizontal surface 108 along the tops of the columns, and a metallic based wall 104 extending between the pair of columns. The columns 102 are structural elements that transmit, through compression, the weight of the structure above (i.e., the beam) to other structural elements below (i.e., the ground). A column is a compression member. The beam 106 is a structural element that primarily resists loads applied laterally to the beam's axis. The beam may have a rectangular, I shaped or H shaped cross section. The columns and beam may be composed of single unit concrete, reinforced concrete, prestressed concrete or cement elements with interior elements, such as rebar. The columns and beam may also be composed of concrete masonry units with interior elements, such as rebar. The columns and beam may also be composed of wood, composite material, concrete, cement or any combination of the above.

The metallic based wall 104 extending between the pair of columns may be composed of a single unit of cast metal, such as iron, steel, galvanized steel, stainless steel, aluminum, nickel or any combination of the above. The metallic based wall 104 may also include non-metallic elements, such as brackets, end pieces or fasteners composed of cement, wood, composite, or related materials.

The wall system of the claimed embodiment would comprise a plurality of columns extending vertically and situated periodically along or substantially near an international border, a plurality of beams extending horizontally between tops of the columns, thereby producing a continuous horizontal surface along the tops of the columns, and a plurality of metallic based walls extending between each pair of columns.

FIG. 1 also shows a conductor 120 which may comprise one more conductors for conducting electrical power (a power line) and communications (a communications line), as discussed in greater detail below. The conductor 120 may be embedded within the beam 106 for protection and anti-corrosion purposes. The conductor 120 may also act as a power line for powering sensor arrays and the railway system, as discussed in greater detail below.

Figure 2:
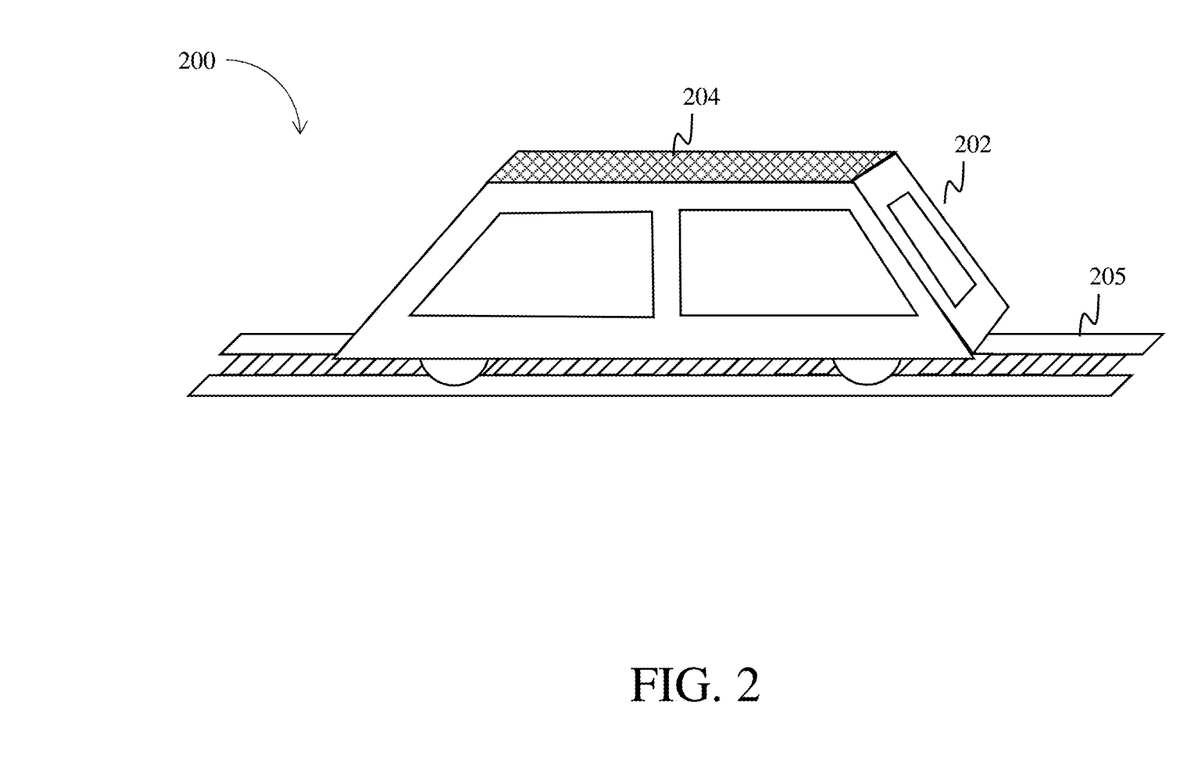
FIG. 2 is a drawing depicting a railcar on a railway segment of an improved border barrier system, in accordance with one embodiment.

FIG. 2 is a drawing depicting a railcar on a railway segment 200 of an improved border barrier system, in accordance with one embodiment. FIG. 2 shows that the segment 200 includes an electric railway 205 coupled to a power line (which may be conductor 120). The electric railway 205 includes tracks (on which the rail cars 202 run) and a railway electrification system. A railway electrification system supplies electric power to rail cars without an on-board prime mover or local fuel supply. Electricity is typically generated in large and relatively efficient power generating stations (or purchased from a utility) and distributed to the rail cars via a power line or distribution line. A power relay station may stand in between the power generating station and the rail car or the electric railway, or railway segment. Power relay stations, also known as an electrical substation, is a part of an electrical generation, transmission, and distribution system. Power relay stations transform voltage from high to low, or the reverse, or perform any of several other important functions. A power relay station may include transformers to change voltage levels between high transmission voltages and lower distribution voltages, or at the interconnection of two different transmission voltages. The power line or distribution line is a continuous conductor running along the track that usually takes one of two forms: overhead line, suspended from poles or towers along the track or from structure or tunnel ceilings, or a third rail mounted at track level and contacted by an element. Both overhead wire and third-rail systems may use the running rails as the return conductor or may use a separate fourth rail for this purpose.

FIG. 2 shows that the segment 200 also includes a rail car 202 which may be an electric locomotive that hauls passengers or freight. The rail car 202 is configured to haul passengers and freight via the electric railway, from station to station. The rail car 202 may have a solar power generating system that necessitates the use of a solar panel 204 located on the roof of the rail car 202. The solar power generating system includes the solar panel, a battery, an electric motor, a power management system and conductors. The solar power generating system generates power from the solar panel, wherein the power generated may be used to power the wheels of the rail car 202 using the electric motor.

Figure 3:
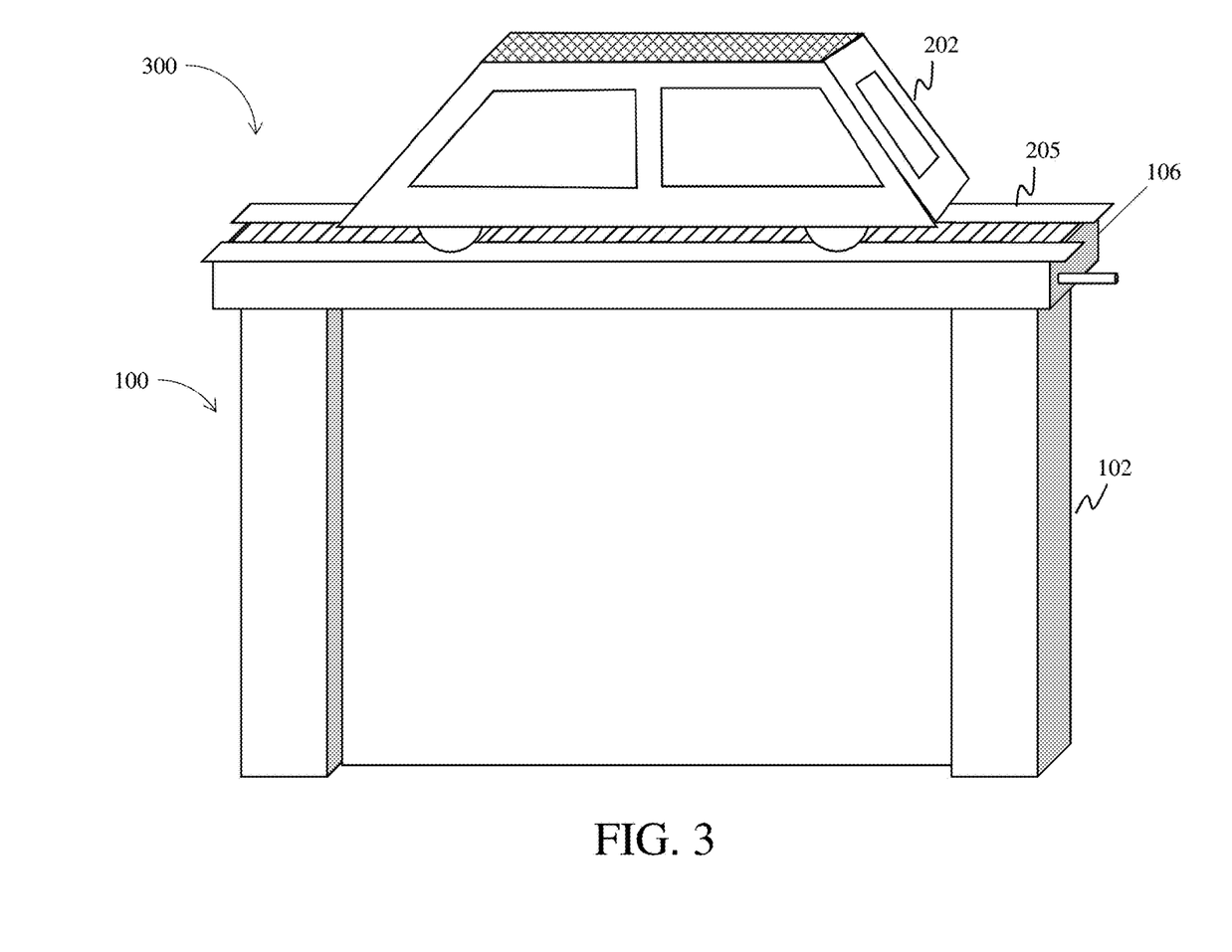
FIG. 3 is a drawing depicting a railcar on a railway segment on a wall segment of an improved border barrier system, in accordance with one embodiment.

FIG. 3 is a drawing depicting a railcar 202 on a wall/railway segment 300 (comprising a railway segment 200 on a wall segment 100) of an improved border barrier system, in accordance with one embodiment. FIG. 3 shows the rail car 202 located on a railway segment 200 that includes an electric railway 205 coupled to a power line. The electric railway is located on the beam 106, which rests on top of the columns 102, with the wall 104 extending between the columns. The combination of the wall segment 100 and the railway segment 200 is a wall/railway segment 300.

Figure 4:
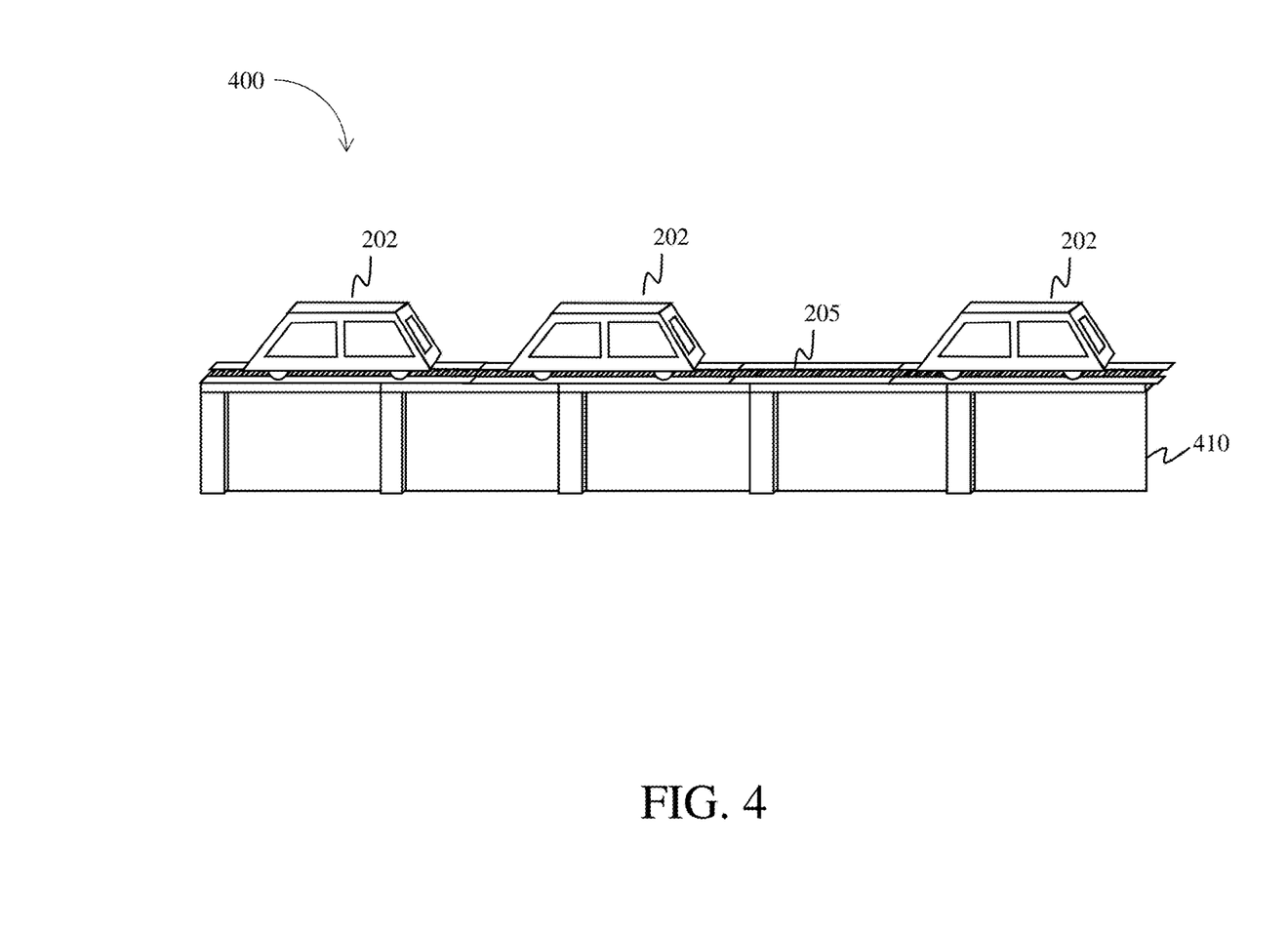
FIG. 4 is a drawing depicting a set of railcars on a railway segment on a wall segment of an improved border barrier system, in accordance with one embodiment.

FIG. 4 is a drawing depicting a set of railcars 202 on a set of wall/railway segments 400 of an improved border barrier system, in accordance with one embodiment. FIG. 4 shows several wall/railway segments 300 have been combined to create a set of wall/railway segments 400 of an improved border barrier system, which includes a set of three rail cars 202 running on an electric railway 205 situated on top of the set of wall/railway segments 400.

Figure 5:
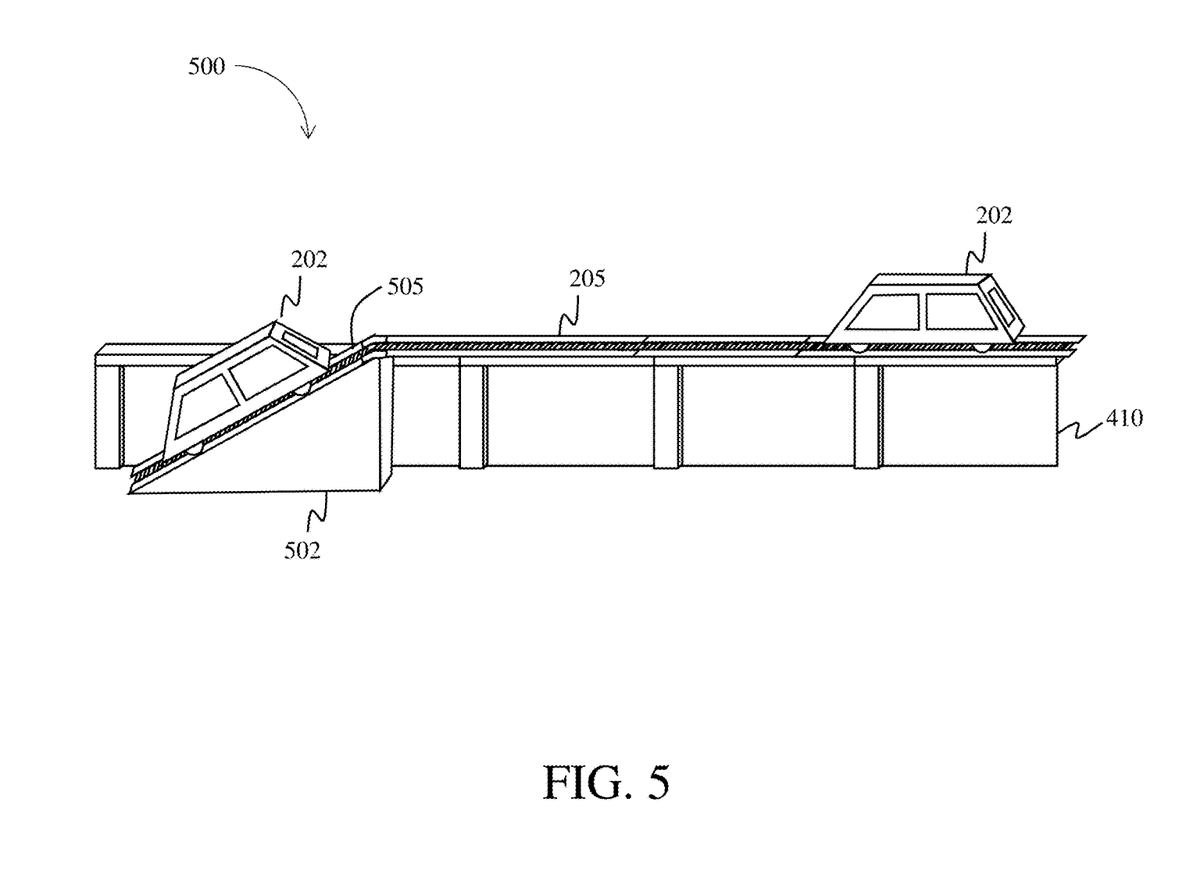
FIG. 5 is a drawing depicting a railway on-ramp on a larger wall/railway segment of an improved border barrier system, in accordance with one embodiment.

FIG. 5 is a drawing depicting a railway on-ramp 502 on a set of wall/railway segments 400 of an improved border barrier system, in accordance with one embodiment. FIG. 5 shows the set of wall/railway segments 400 has been combined with an on-ramp 502 to create an on-ramp-enabled set of wall/railway segments 500 of an improved border barrier system. The on-ramp 502 is a segment of railway that directs rail car traffic from a lower rail or road onto the elevated railway 205. The on-ramp 502 may be composed of single unit concrete, reinforced concrete, prestressed concrete or cement elements with interior elements, such as rebar. The on-ramp 502 may also be composed of concrete masonry units. The on-ramp-enabled set of wall/railway segments 500 includes a set of two rail cars 202 running on an electric railway 205 situated on top of the on-ramp-enabled set of wall/railway segments 500. The on-ramp 502 of the on-ramp-enabled set of wall/railway segments 500 includes an electric railway 505 that is communicably and conductively coupled to the railway 205.

Figure 6:
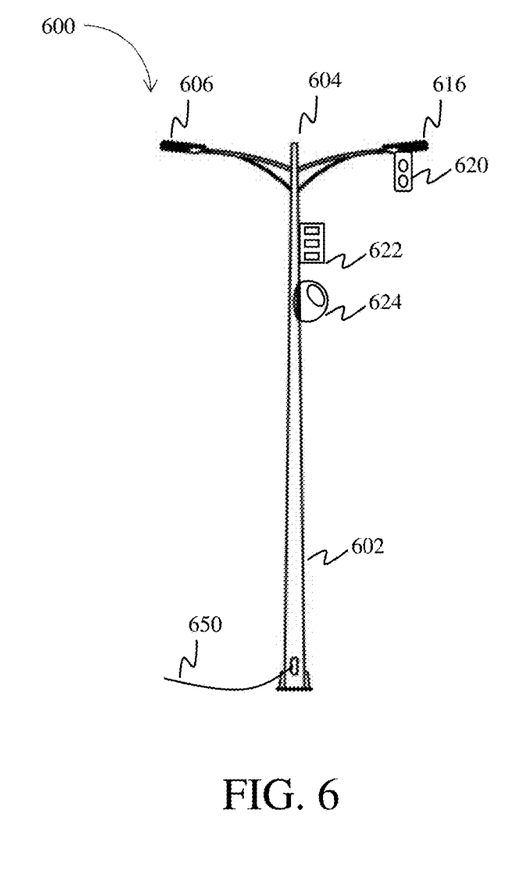
FIG. 6 is a drawing depicting a sensor array of an improved border barrier system, in accordance with one embodiment.

FIG. 6 is a drawing depicting a sensor array 600 of an improved border barrier system, in accordance with one embodiment. The sensor array 600 may comprise a vertical shaft or pole 602 that extends from the ground to a top portion 604, as well as an arm extending horizontally outwards from either side of the top portion 604. The sensor array 600 may comprise a light 606 at the end of the first arm and a light 616 at the end of the second arm. The lights 606, 616 may be configured to illuminate a large area surrounding the sensor array 600. The sensor array 600 may further comprise housings 620, 622 and 624, each of which may comprise a video sensor, an audio sensor, an infrared sensor, a heat sensor, a motion sensor, a light sensor, and a seismic sensor. Using said sensors, the sensor array may collect video data, audio data, infrared data, heat data, motion data, light data and seismic data. The sensor array 600 may be communicatively coupled to a network wirelessly or via a wired connection 650, which may also act as a power line for powering the sensor array 600. The wired connection 650 may be connected to the power line for the railway system. The data collected by the sensors may be transmitted via the wired connection 650 or a wireless connection to a central location or to a network. The sensors may further be controlled via the wired connection 650 or a wireless connection to a network. The wired connection may also act as a communication line.

Figure 7:
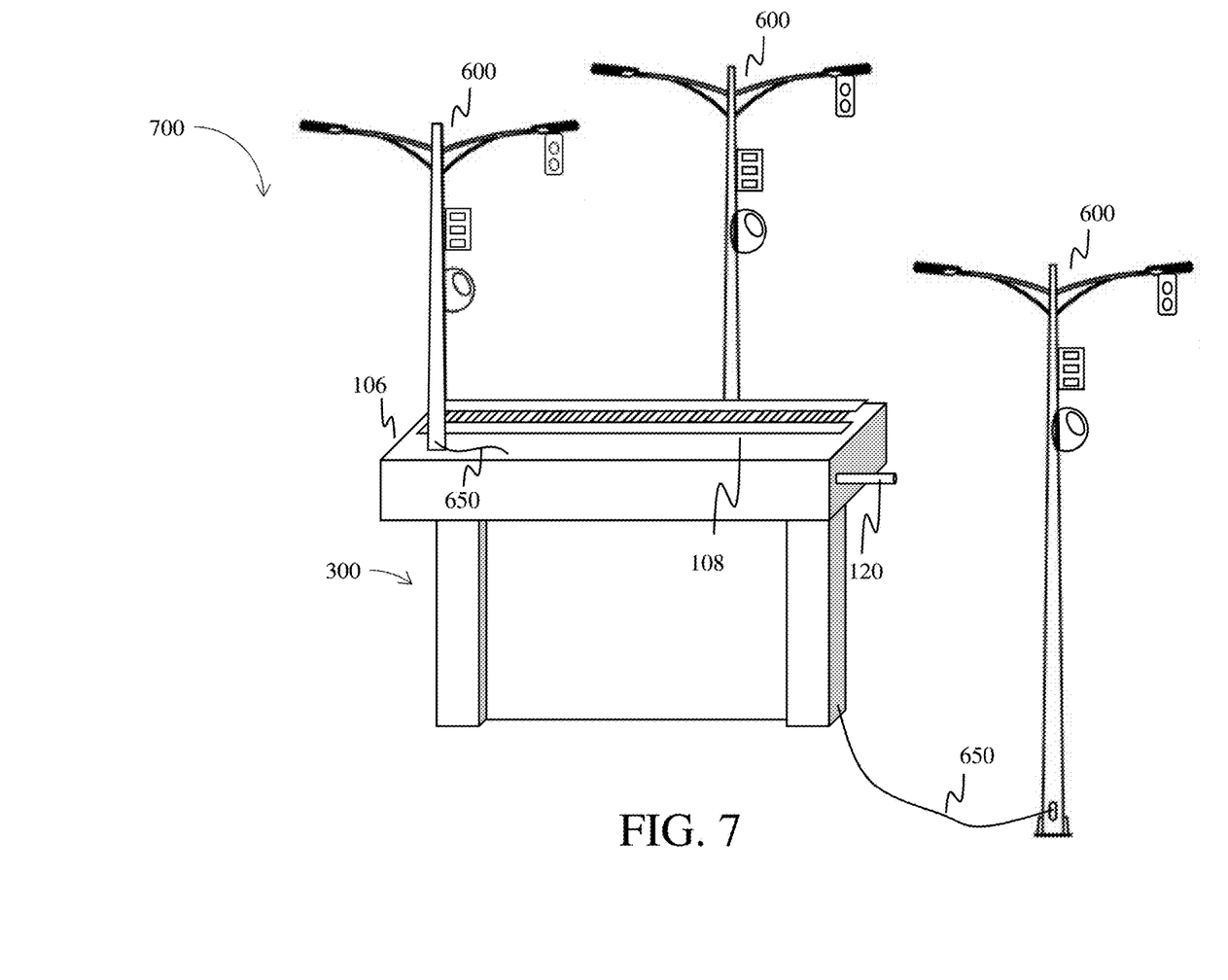
FIG. 7 is a drawing depicting multiple sensor arrays on a wall segment of an improved border barrier system, in accordance with one embodiment.

FIG. 7 is a drawing depicting multiple sensor arrays 600 on a wall/railway segments 300 of an improved border barrier system, in accordance with one embodiment. FIG. 7 shows a sensor array 600 may be located on the ground on one side of the wall 100 or the opposite side of the wall. FIG. 7 also shows a sensor array 600 may be located on the horizontal surface 108 of the beam 106 of the wall 100. Placing the sensor array in said different locations allows for greater security coverage of the area on both sides of the wall 100, as well as on top of the wall 100. FIG. 7 also shows more than one sensor array 600 may include a wired connection 650 that extends into the beam 106 and is conductively coupled to the conductor 120. The conductor 120 carries electrical power for powering the components of the sensor arrays and carries data between the sensor arrays. The system of sensor arrays 600 in combination with the wall/railway segments 300 comprises a sensor-arrayed wall/railway segment 700.

Figure 8:
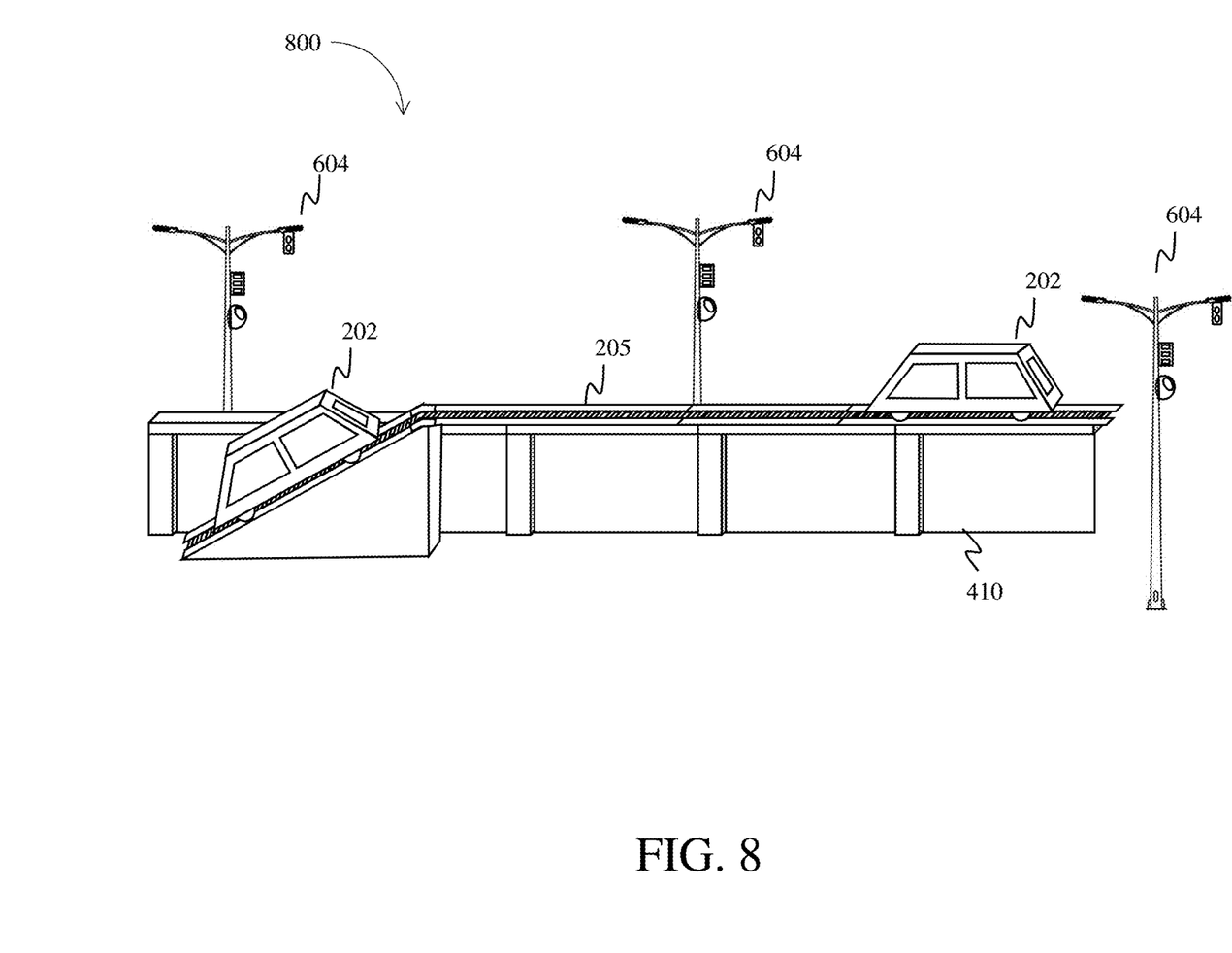
FIG. 8 is a drawing depicting multiple sensor arrays on a larger wall/railway segment, including a railway on-ramp, of an improved border barrier system, in accordance with one embodiment.
Figure 9:
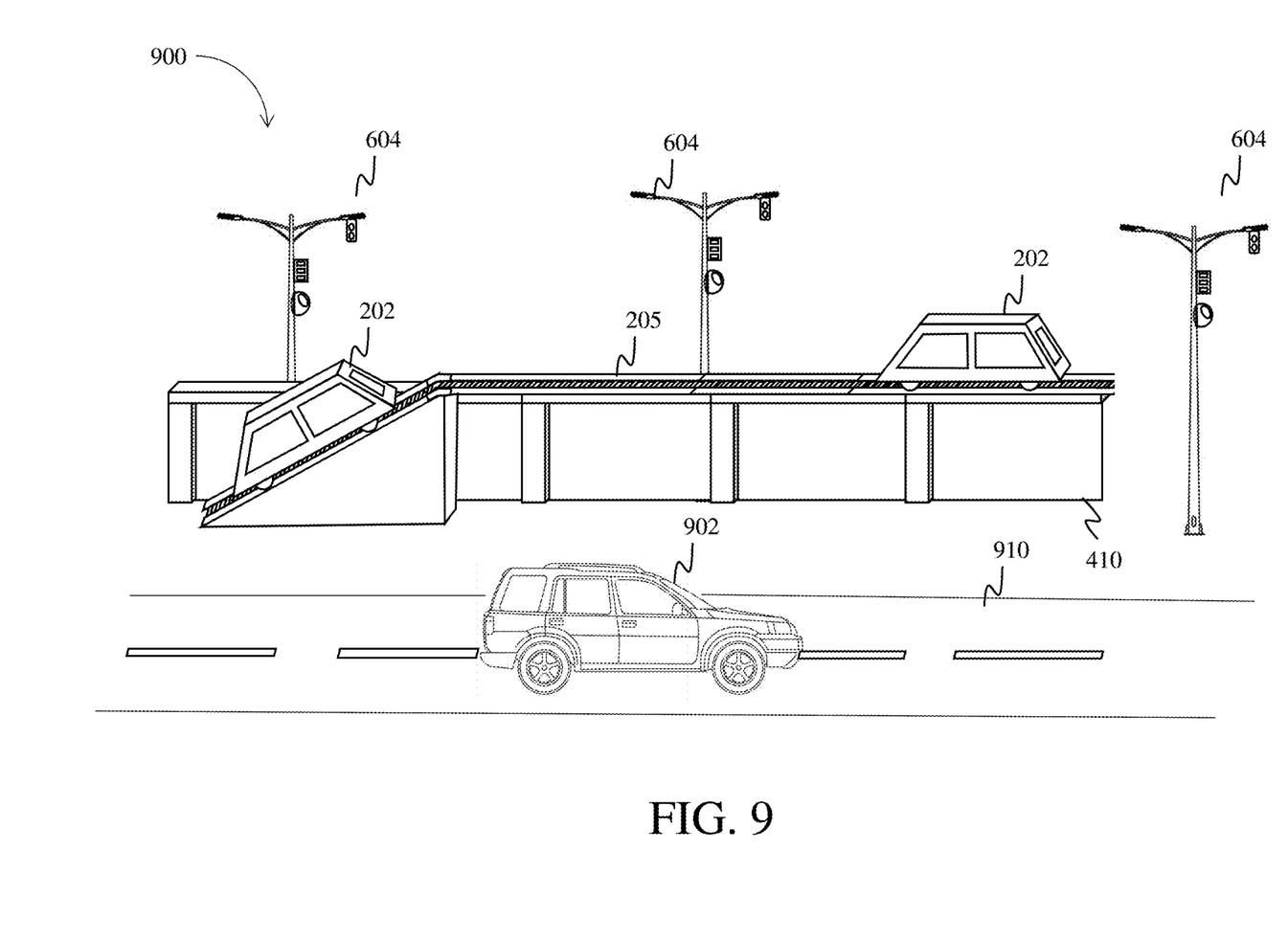
FIG. 9 is a drawing depicting a service road adjacent to a sensor arrayed larger wall/railway segment of an improved border barrier system, in accordance with one embodiment.

FIG. 8 is a drawing depicting multiple sensor arrays on on-ramp-enabled set of wall/railway segments 500, including a railway on-ramp 502, of an improved border barrier system, in accordance with one embodiment. The system of sensor arrays 600 in combination with the on-ramp-enabled set of wall/railway segments 500 comprises a sensor arrayed, on-ramp-enabled set of wall/railway segments 800. FIG. 9 is a drawing depicting a service road 910 adjacent to a sensor arrayed, on-ramp-enabled set of wall/railway segments 800 of an improved border barrier system, in accordance with one embodiment. The system 900 shown in FIG. 9 comprises the service road 910 and the sensor arrayed, on-ramp-enabled set of wall/railway segments 800. The service road 910 runs alongside the border barrier system for purposes of private access, maintenance, and/or security. The service road allows vehicles 902 to operate on the road to access various different areas of the border barrier system. A service road may be located on either side of the border barrier system.

Figure 10:
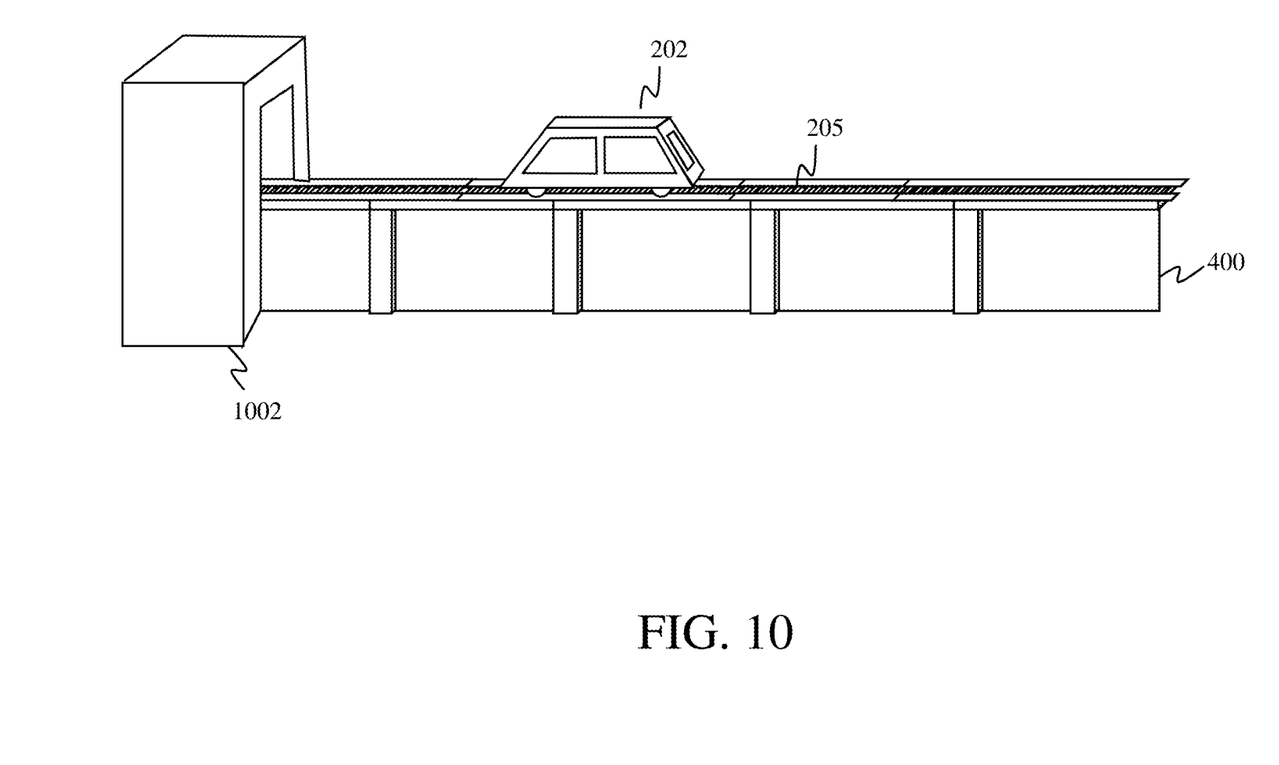
FIG. 10 is a drawing depicting a station and a larger wall/railway segment of an improved border barrier system, in accordance with one embodiment.

FIG. 10 is a drawing depicting a station 1002 and a set of wall/railway segments 400 of an improved border barrier system, in accordance with one embodiment. A station may be a structure configured to house personnel, a power generating station, a power relay station, a headquarters or the like. The station may include a tunnel that allows the railway to enter and exit the station such that personnel and rail cars may be covered when inside the station.

Figure 11:
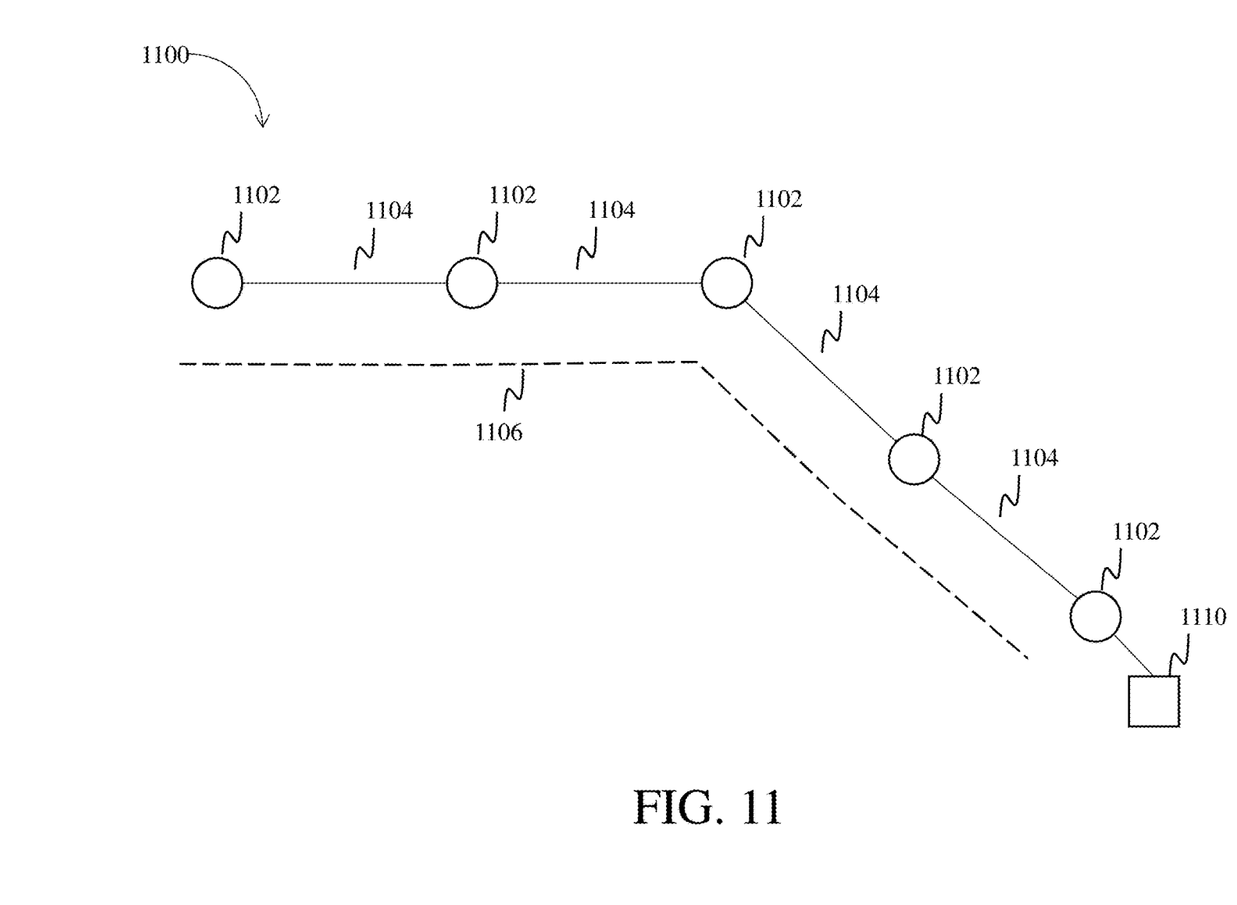
FIG. 11 is a drawing depicting a high-level map of an improved border barrier system, showing the locations of stations, in accordance with one embodiment.

FIG. 11 is a drawing depicting a high-level map 1100 of an improved border barrier system, showing the locations of stations 1102, in accordance with one embodiment. FIG. 11 shows that stations are located periodically along the border barrier system, such as every 10 miles. Between the stations are larger wall/railway segments 1104. A power generating station 1110 may be located at one end of the border barrier, which provides power via the power line (or the conductor 120) and the electric railway to the rail cars, railway, stations and sensor arrays. FIG. 11 also shows the service road 1106 running alongside the border barrier system.

In another embodiment, in areas with difficult geographies, such as mountainous areas, the railway may be a cogwheel railway that assists the rail cars from moving along the railway, so as to access all points in the border barrier and the stations. A rack railway (also rack-and-pinion railway, cog railway, or cogwheel railway) is a steep grade railway with a toothed rack rail, usually between the running rails. The rail cars are fitted with one or more cog wheels or pinions that mesh with this rack rail. This allows the rail cars to operate on steep grades above around 7 to 10%, which is the maximum for friction-based rail. Most rack railways are mountain railways, although a few are transit railways or tramways built to overcome a steep gradient in an urban environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A border barrier system, comprising:
    (a) a plurality of columns extending vertically and situated periodically along or substantially near an international border;
    (b) a plurality of beams extending horizontally between tops of the columns, thereby producing a continuous horizontal surface along the tops of the columns;
    (c) a plurality of metallic based walls extending between each pair of columns;
    (d) a power line extending within the plurality of beams, wherein the power line supplies power from a power generating station or a power relay station;
    (e) at least one continuous electric railway located on top of the horizontal surface, wherein the electric railway is coupled to the power line;
    (f) a plurality of electric rail cars powered by the electric railway, wherein the electric rail cars run along the electric railway;
    (g) a plurality of sensor arrays located periodically along the border barrier system, wherein each sensor array is coupled to the power line, and wherein each sensor array comprises a vertical shaft, a video sensor, an audio sensor, an infrared sensor, a heat sensor, a motion sensor, a light sensor, a seismic sensor, and at least one light for providing illumination;
    (h) a plurality of stations located periodically along the border barrier system, each station comprising:
        1) a housing structure configured for housing personnel;
        2) a power generating station or power relay station coupled to the power line and the electric railway for powering the electric railway; and
        3) a tunnel that allows the electric railway to enter one end of the housing structure and exit another end of the housing structure.

2. The border barrier system of claim 1, further comprising a communication line coupled to each of said plurality of sensor arrays.

3. The border barrier system of claim 2, wherein each of said plurality of electric rail cars comprises a solar panel and a solar power generating system.

4. The border barrier system of claim 3, further comprising a plurality of on-ramps situated periodically along the border barrier system.

5. The border barrier of claim 4, further comprising a service road located alongside the border barrier system.

* * * * *